Figure 1:
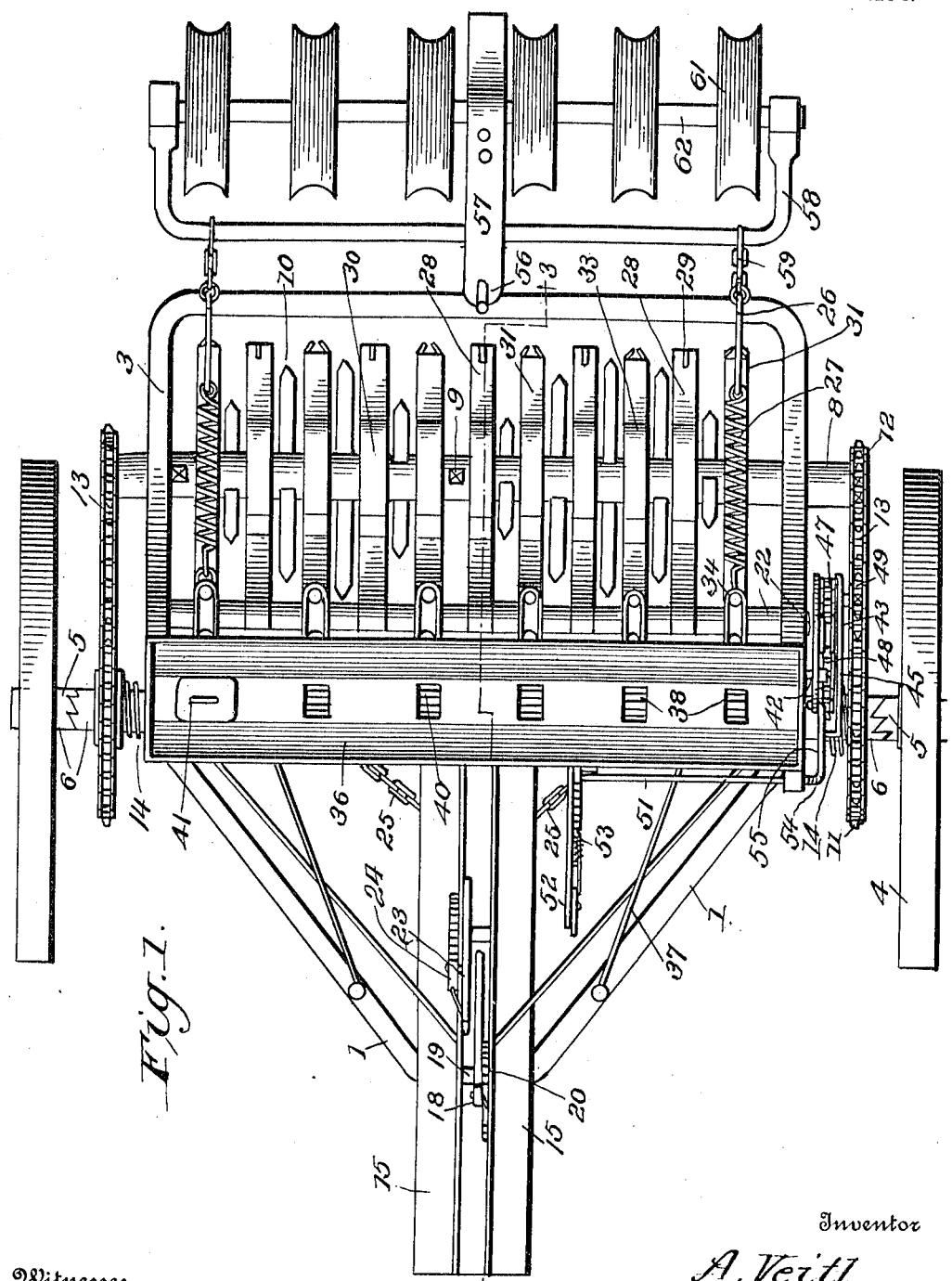

A. VEITL.
COMBINED PLANTER, PULVERIZER, AND WEED DESTROYER.
APPLICATION FILED JUNE 10, 1912.

1,082,055.

Patented Dec. 23, 1913.

3 SHEETS—SHEET 1.

Witnesses

Inventor
A. Veitl
By
Attorneys.

A. VEITL.
COMBINED PLANTER, PULVERIZER, AND WEED DESTROYER.
APPLICATION FILED JUNE 10, 1912.
1,082,055.
Patented Dec. 23, 1913.
3 SHEETS—SHEET 2.
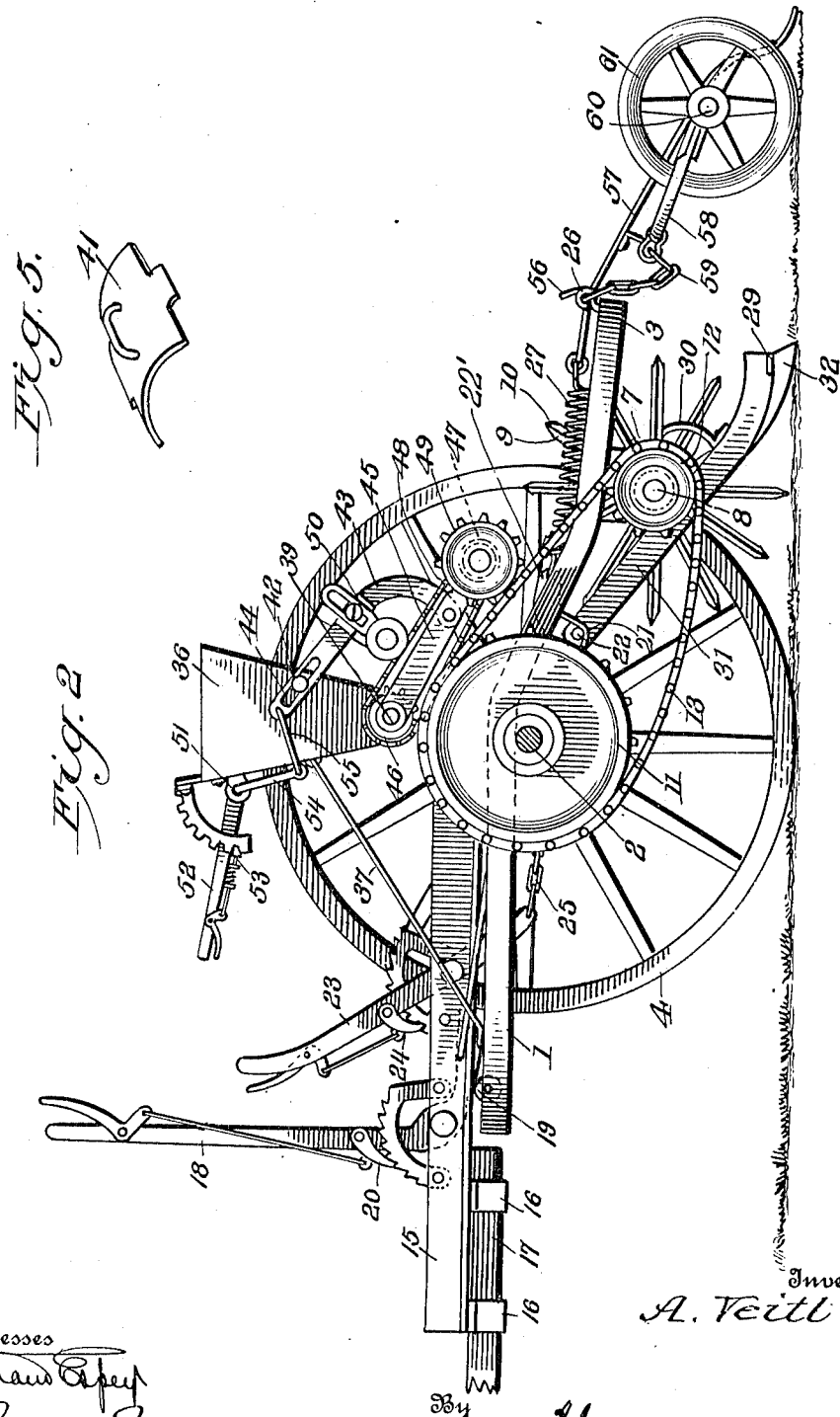

A. VEITL.
COMBINED PLANTER, PULVERIZER, AND WEED DESTROYER.
APPLICATION FILED JUNE 10, 1912.
1,082,055.
Patented Dec. 23, 1913.
3 SHEETS—SHEET 3.
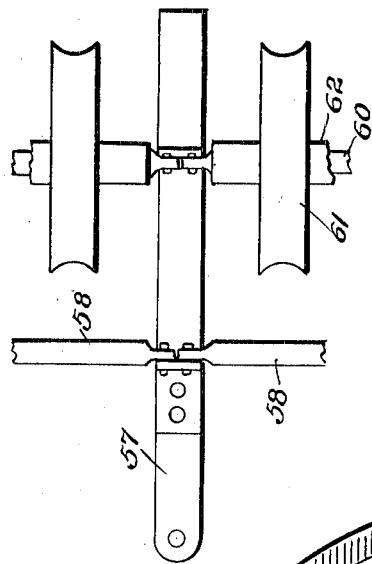
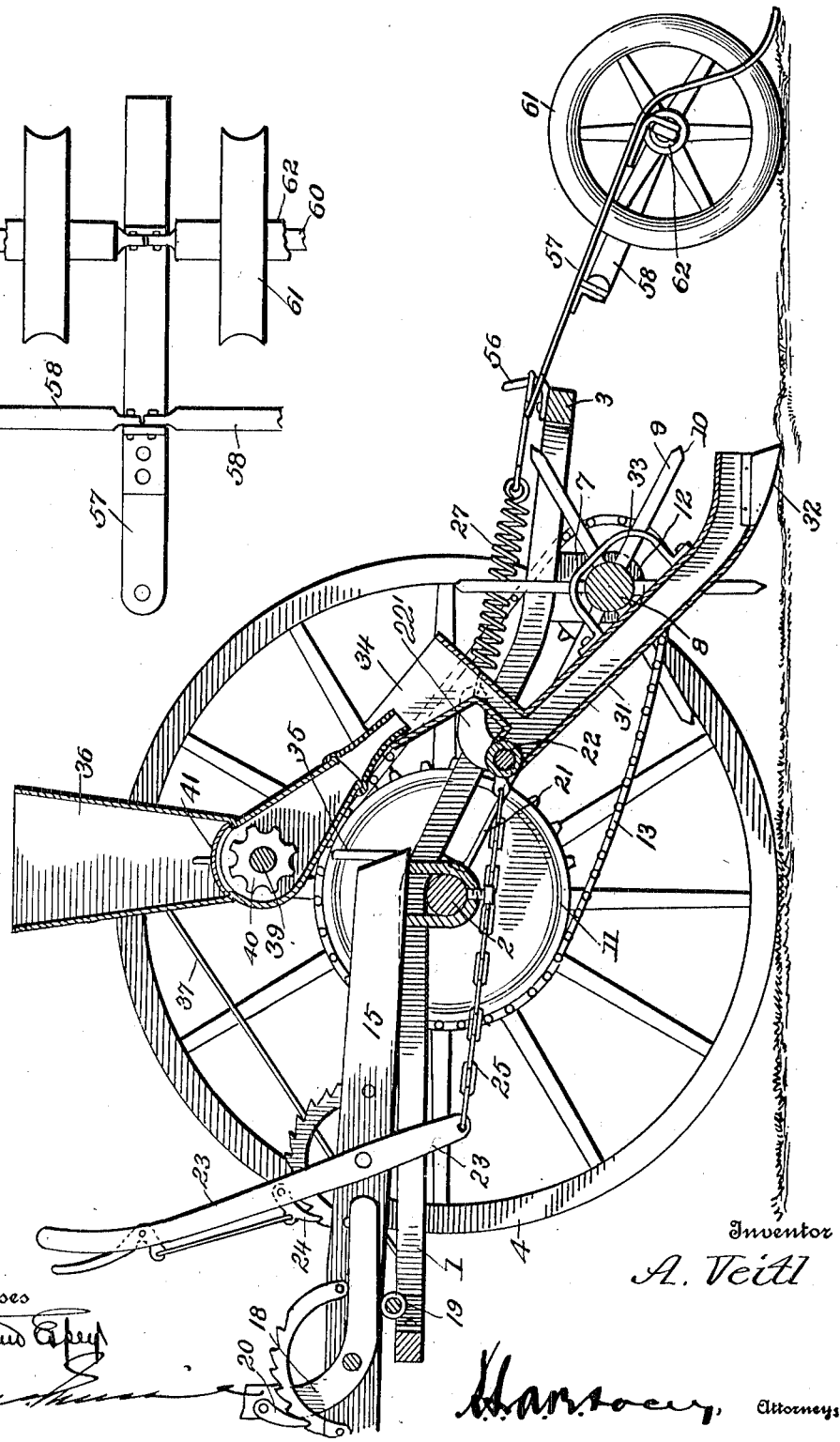

UNITED STATES PATENT OFFICE.

ALBERT VEITL, OF DEADWOOD, SOUTH DAKOTA, ASSIGNOR TO DAKOTA FARM MACHINE COMPANY, OF DEADWOOD, SOUTH DAKOTA.

COMBINED PLANTER, PULVERIZER, AND WEED-DESTROYER.

1,082,055.  Specification of Letters Patent.  Patented Dec. 23, 1913.

Application filed June 10, 1912. Serial No. 702,839.

*To all whom it may concern:*

Be it known that I, ALBERT VEITL, citizen of the United States, residing at Deadwood, in the county of Lawrence and State of South Dakota, have invented certain new and useful Improvements in Combined Planters, Pulverizers, and Weed-Destroyers, of which the following is a specification.

This invention has relation to combined planters, pulverizers, and weed destroyers, and has for its object to provide a machine which may be easily and quickly transformed to either of the forms of apparatus as stated. If desired, all of the forms may be caused to operate in and upon the soil at the same time.

In the drawings: Figure 1 is a top plan view of the machine; Fig. 2 is a side elevation of the same with one of the supporting wheels removed; Fig. 3 is a vertical longitudinal sectional view of the same on line 3—3 Fig. 1; Fig. 4 is an under view of part of the trailing frame; Fig. 5 is a perspective view of a closure that may be used in the hopper for closing one of the grain outlets.

Corresponding and like parts are referred to in the following description and indicated in all the views of the accompanying drawings by the same reference characters.

As illustrated in the accompanying drawing, the machine includes a frame 1 which is mounted upon an axle 2. The rear part of the frame 1, as at 3, is disposed in a lower plane than the forward part of the said frame. Supporting wheels 4 are freely journaled for rotation upon the end portions of the axle 2. These wheels are provided with clutch hubs 5 which are adapted to engage clutch members 6, also journaled upon the axle 2. Bearing blocks 7 are carried at the rear portion of the frame 1, and a shaft 8 is journaled for rotation in the said blocks. Radially disposed teeth 9 are carried by the shaft 8, and these teeth are arranged in a spiral row longitudinally of the shaft 8, as best seen in Fig. 1 of the drawing. The teeth 9 are square in transverse section and are provided with pointed ends 10. Sprocket wheels 11 are mounted on the clutch members 6 and sprocket wheels 12 are mounted upon the ends of the shaft 8. Sprocket chains 13 are trained around the sprocket wheels 11 and 12, there being a sprocket chain located at each side of the machine. Springs 14 are mounted upon the end portions of the axle 2 and serve to hold the clutch members 6 in engagement with the clutch hubs 5 of the wheels 4.

A tongue support 15 is mounted upon the intermediate portion of the axle 2, and the intermediate portion of the said support extends across the forward part of the frame 1. The tongue support 15 is provided with clips 16 which receive the rear part of a tongue 17. A lever 18 is pivoted upon the intermediate portion of the tongue support 15 and is provided with an angularly disposed end which bears against the periphery of a roller 19 journaled at the forward part of the frame 1. The lever 18 and tongue support 15 are provided with a holding device 20 of usual pattern in order that the said lever may be held at an adjusted position upon the tongue support. By this arrangement it will be seen that by swinging the lever 18 the part thereof that bears upon the roller 19 will cause the forward part of the frame 1 to descend when the upper end of the lever 18 is swung in a rearward direction. As the forward part of the frame 1 descends the rear part 3 thereof is elevated, and thus the teeth 9 may be moved above the surface of the soil, or the parts may be so adjusted as to cause the teeth to operate at any desired distance below the surface of the soil.

Guides 21 are provided at the sides of the frame 1 and extend in a general downward direction from the forward part of the frame toward the rear part 3 thereof. A shaft 22 passes at its end portions through the guides 21, and the said shaft is adapted to slide in the guides forward and backward along the frame 1. A lever 23 is pivotally mounted upon the tongue support 15, and a holding device 24 is provided for the said lever. Chains 25 connect the lower end of the lever 23 with the shaft 22. Hooks 26 are carried at the rear part 3 of the frame 1, and the rear ends of springs 27 are connected with the said hooks, the forward ends of the springs being connected with the shaft 22 by arms 22' extending upwardly and rearwardly from said shaft. The springs 27 tend to hold the shaft 22 toward the rear part of the guides 21. By this arrangement it will be seen that by swinging the lever 23 in a rearward direction the shaft 22 will be drawn in a forward direction along the frame 1 against the tension of the springs 27, and the said springs 27 will tend to resiliently hold the said shaft 22 toward the rear ends of the guides 21 and thus the members (hereinafter described) carried by the shaft 22 will be caused to operate at a desired depth below the surface of the soil.

A series of drag teeth 28 are pivotally mounted upon the shaft 22. These teeth are solid and square in transverse section. Each tooth 28 is provided at its rear end with a shoe 29. As these shoes wear they may be removed and new ones substituted in their stead. The teeth 28 are curved so that their rear end portions lie approximately flat upon the surface of the soil. The teeth 28 are provided with yokes 30 which receive the shaft 8.

Hollow grain tubes 31 are pivoted upon the shaft 22, and these tubes are square in transverse section. Each tube 31 is provided at its lower end with shoes 32 which are detachably connected with the tubes so that they may be removed when worn and new ones substituted. These shoes are intended to open shallow furrows in the soil so that the grain which passes down the tubes may enter the soil. The tubes 31 are provided with yokes 33 which receive the shaft 8; therefore when the rear part 3 of the frame is raised the yokes 30 and 33 will raise the rear ends of the drag teeth 28 and grain tubes 31. Each grain tube 31 is provided at its upper end with a chute 34, the said chutes being disposed upon the upper rear sides of the tubes.

Supports 35 are mounted upon the end portions of the axle 2, and a seed box 36 is mounted upon the said supports. Braces 37 connect the forward part of the seed box 36 with the forward part of the frame 1. The seed box 36 is provided in its bottom with openings 38. These openings correspond in number with the grain tubes 31. A shaft 39 is journaled below the bottom of the box 36 and traverses the length thereof. The said shaft is provided with a series of seed separating and dropping wheels 40. These wheels are rotated directly below the openings 38. Cover plates 41 are provided, and when used are adapted to close the openings 38. As many cover plates may be employed as desired for covering the individual openings 38 so that the rows of seed drilled by the machine may be close together or far apart.

Means for rotating the shaft 39 is provided, and this means will now be described. A pin 42 is mounted at one end of the box 36. An arm 43 is provided with a slot 44 within which the pin 42 is received. A frame 45 is carried in part by the arm 43 and in part by the shaft 39. A sprocket wheel 46 is fixed to the shaft 39 at the upper end of the frame 45. A sprocket wheel 47 is journaled at the lower end of the frame 45, and a sprocket chain 48 is trained around the wheels 46 and 47. A sprocket wheel 49 is fixed to the axis of the sprocket wheel 47 and is located directly above the upper run of one of the chains 13. A slack absorber 50 is carried by the arm 43 and is located directly above the upper run of the chain 48. A shaft 51 is journaled at the forward side of the box 36, and a lever 52 is fixed to the inner end of the said shaft. A holding device 53 is provided for the lever 52 and is adapted to hold the same at an adjusted position. An arm 54 is carried at the outer end of the shaft 51 and a link 55 pivotally connects the free end of the arm 54 with the arm 43. Therefore it will be seen that by swinging the lever 52 the connecting parts will move the arm 43 across the pin 42 and the link 55 will swing the forward end of the arm 43 in a downward direction which will lift the rear end of the frame 45 and move the sprocket wheel 49 out of engagement with the outer run of the chain 13. When this is done the wheel 49 will cease to rotate and the parts connected therewith will cease to operate so that the seed dropping operation is interrupted. When the wheel 49 is moved into engagement with the upper run of the chain 13, and the machine moves over the ground, the seed dropping operation will be resumed.

The frame 1 is provided at its rear end with an upstanding hook 56. A spring arm 57 is engaged at its forward end with the said hook. The rear part of the arm 57 is rearwardly and downwardly curved and is adapted to trail along the soil. Frame members 58 are pivotally connected together at their inner ends and are pivotally connected with the forward part of the arm 57. The outer end portions of the frame members 58 are connected with the hooks 26 by means of chain sections 59. Shaft sections 60 are carried at their outer ends by the outer portions of the frame members 58, and the inner ends of the said shaft sections are pivotally connected with the arm 57. Presser wheels 61 are journaled upon the shaft sections 60 and are spaced apart by means of collars 62, also mounted upon the shaft sections between the hubs of the adjacent presser wheels. The presser wheels are adapted to move over the soil behind the grain tubes and close the furrows into which the said tubes have deposited the seed.

From the above description it will be seen that a machine is provided which may be used at once for drilling seed, for pulverizing the soil, destroying weeds, and also for closing the furrows into which the seed is dropped. By permitting the shaft or rod 22 to remain at its rearmost position and slightly lifting the rear end of the main frame, the harrow or pulverizing teeth 9 will be lifted from the ground, while the drag teeth and the seed tubes will remain in contact with the ground. If the rear end of the main frame be lowered, while, at the same time, the rod 22 is drawn forward, the drag teeth and the seed tubes will be raised from the ground without drawing the harrow teeth 9 therefrom and, as before stated, by manipulating the lever 52, the sprocket wheel 47 may be raised out of engagement with the sprocket chain 13 and the seed separating or dropping mechanism thereby rendered inoperative.

The yokes 33 prevent weeds and trash from winding around the shaft. The sprocket 47 may be of any desired size so as to obtain the requisite speed in planting according to the nature of the seed. In practice, a plurality of sprockets of various sizes will be provided and they may be used interchangeably, the shaft being equipped with a removable cotter pin at its end to facilitate the exchange.

Having described the invention, what I claim as new is:

1. An agricultural machine comprising a wheel mounted frame, seed separating and dropping mechanisms carried by the frame and including seed tubes depending from the frame, soil engaging members carried by the frame, drag teeth carried by and depending from the frame alternately with the said seed tubes, said soil engaging members being arranged to operate between the drag teeth and the seed dropping members, and furrow closers connected to the frame in rear of the seed tubes.

2. An agricultural machine comprising a wheel mounted frame, a shaft carried by the frame, means for moving said shaft along the frame, drag teeth pivoted to the shaft, grain tubes pivoted to the shaft and spaced from the drag teeth, means for supplying the grain to the grain tubes, and soil engaging members arranged to operate between the drag teeth and the grain tubes.

3. An agricultural machine comprising a wheel mounted frame, a shaft slidably mounted upon the frame, drag teeth pivoted to the shaft, grain tubes pivoted to the shaft and spaced from the drag teeth, means for supplying grain to the grain tubes, and a shaft journaled upon the frame and having radially disposed teeth adapted to operate between the drag teeth and the grain tubes.

4. An agricultural machine comprising a wheel mounted frame, guides carried by the frame, a shaft movably mounted in the guides, resilient means for normally holding the shaft toward one end of the guides, a lever mechanism for moving the shaft toward the opposite end of the guides, drag teeth pivoted to the shaft, grain tubes pivoted to the shaft, means for supplying seed to the grain tubes, and teeth mounted for rotation about an axis carried by the frame and adapted to operate between the drag teeth and the grain tubes.

5. An agricultural machine comprising a wheel mounted frame, a tongue support above the frame, a lever fulcrumed upon the tongue support and engageable with the frame, a shaft journaled to the frame and carrying soil engaging members, drag members pivoted to the frame and located between the soil engaging members, and yokes carried by the drag members which extend over the shaft.

6. An agricultural machine comprising a wheel mounted frame, a shaft journaled upon the frame and carrying soil engaging members, a grain box carried by the frame, a seed separating mechanism carried by the grain box, a chain for operating the shaft from one of the supporting wheels of the machine, a frame connected to the grain box and carrying means for engagement with said chain to operate the seed dropping mechanism, and means for raising and lowering the last-mentioned frame.

7. An agricultural machine comprising a wheel mounted frame, a shaft journaled to the frame and carrying soil engaging members, a chain for rotating said shaft from one of the supporting wheels, a seed box carried by the frame, an arm slidably and pivotally mounted with relation to the seed box, means for moving said arm, a seed dropping mechanism carried by the box, a frame pivotally connected with the box and pivotally connected with said arm, and means carried by the frame for operating the seed dropping mechanism and engageable with said chain.

In testimony whereof I affix my signature in presence of two witnesses.

ALBERT VEITL. [L. S.]

Witnesses:
I. SALINSKY,
E. M. HILTON.